United States Patent [19]
Ragnarsson et al.

[11] Patent Number: 6,099,400
[45] Date of Patent: Aug. 8, 2000

[54] METHOD AND APPARATUS FOR PROCESSING SHRIMP

[75] Inventors: Kjartan Ragnarsson, Hafnarfjordur; Sigurdur Kristinsson, Grindavik, both of Iceland

[73] Assignee: Brontec Limited, Iceland

[21] Appl. No.: 09/020,166

[22] Filed: Feb. 6, 1998

[51] Int. Cl.⁷ .................................................. A22C 29/02
[52] U.S. Cl. .................................................... 452/5; 452/2
[58] Field of Search ........................................ 452/5, 2, 1

[56] References Cited

U.S. PATENT DOCUMENTS

| | | | |
|---|---|---|---|
| 3,691,591 | 9/1972 | Muller | 452/5 |
| 3,975,797 | 8/1976 | Grimes et al. | 452/5 |
| 4,769,870 | 9/1988 | Hansen et al. | 452/5 |
| 4,862,794 | 9/1989 | Lapeyre et al. | 452/5 |
| 5,120,265 | 6/1992 | Ladet et al. | 452/2 |
| 5,195,921 | 3/1993 | Ladet | 452/2 |

FOREIGN PATENT DOCUMENTS

| | | | |
|---|---|---|---|
| 3535681 | 4/1987 | Germany | 452/2 |

*Primary Examiner*—Willis Little
*Attorney, Agent, or Firm*—Kenyon & Kenyon

[57] ABSTRACT

An apparatus for processing shrimp, comprises a first conveyor for transporting the cooked shrimp away from a cooking unit, a cooling device for cooling the cooked shrimp received from the first conveyor, a second conveyor for transporting the cooled shrimp from the cooling device to a peeling device, and a control device for controlling the second conveyor so that shrimp are delivered to the peeling device at a predetermined temperature distribution.

23 Claims, 3 Drawing Sheets

METHOD AND APPARATUS FOR PROCESSING SHRIMP

FIELD OF THE INVENTION

The present invention relates generally to a method and an apparatus for processing shrimp and more specifically relates to a method and apparatus for peeling shrimp.

BACKGROUND INFORMATION

Cooked, peeled shrimp available to consumers are prepared in a high volume processing environment. The processing can either take place on board a ship immediately after the shrimp are caught or later when the shrimp are on snore. The shrimp are first boiled until reaching an ideal temperature assuring that the shrimp are completely cooked. After leaving the boiler the hot shrimp are fed through a shell breaking machine and a peeling machine where the shell is removed from the flesh of the shrimp creating the final product for market.

Ideally the shell breaking machine and shrimp peeler would only remove the shell of the shrimp, leaving all the flesh to be sold at market. However, in reality the shrimp peeling machine removes a certain amount of flesh when removing the shell, thereby reducing the amount of final product produced per shrimp caught.

The applicants have identified a disadvantage of the processing method described above, namely that as the shrimp leave the boiler and move to the peeling machine the shell of the shrimp cools slightly at a rate faster than a cooling of the flesh creating a temperature differential between the shell and the flesh. This temperature differential increases the amount of flesh removed along with the shells, resulting in fewer pounds of cooked, peeled shrimp for the market per pound of shrimp caught.

Applicants have also noted that when shrimp arrive at the peeling machine at a relatively high temperature, the efficiency of the peeling machine (i.e. the amount of flesh removed along with the shells) is reduced.

FIG. 1 shows a known processing arrangement for the preparation of shrimnp. The first step in preparing the shrimp for market is to thoroughly cook the shrimp in cooking unit 1. When the cooking process is complete, the shrimp are removed from cooking unit 1 via conveyer 2. The shrimp leaving cooking unit 1 are generally in a temperature range of 70–80° C. Conveyer 2 transports the cooked shrimp to a peeling machine 3 consisting of a shell breaker 5 and a peeler 4, where the cooked shrimp have their shells broken and removed leaving the final product for market at the outlet of peeling machine 3. While on conveyor 2 being transported to the peelinrg machine 3, the cooked shrimp are exposed to ambient temperature conditions in the processing facility which may cause the shrimp to cool slightly. During this slight cooling, the shell of the shrimp cools more rapidly than the flesh causing a temperature differential of approximately 10–30° C. between the shell and the flesh of the shrimp. This temperature differential and the relatively high temperature of both the shell and the flesh reduces the efficiency of the peeling machine (i.e., more flesh is removed with the shells).

SUMMARY OF THE INVENTION

The present invention is directed to an apparatus for processing shrimp, comprising a first conveyor for transporting cooked shrimp away from a cooking unit and a cooling device for cooling the cooked shrimp received from the first conveyor. A second conveyor for transporting the cooled shrimp from the cooling device to a peeling device and a control device for controlling the second conveyor so that shrimp are delivered to the peeling device at a predetermined temperature distribution.

DETAILED DESCRIPTION

Figure 1:
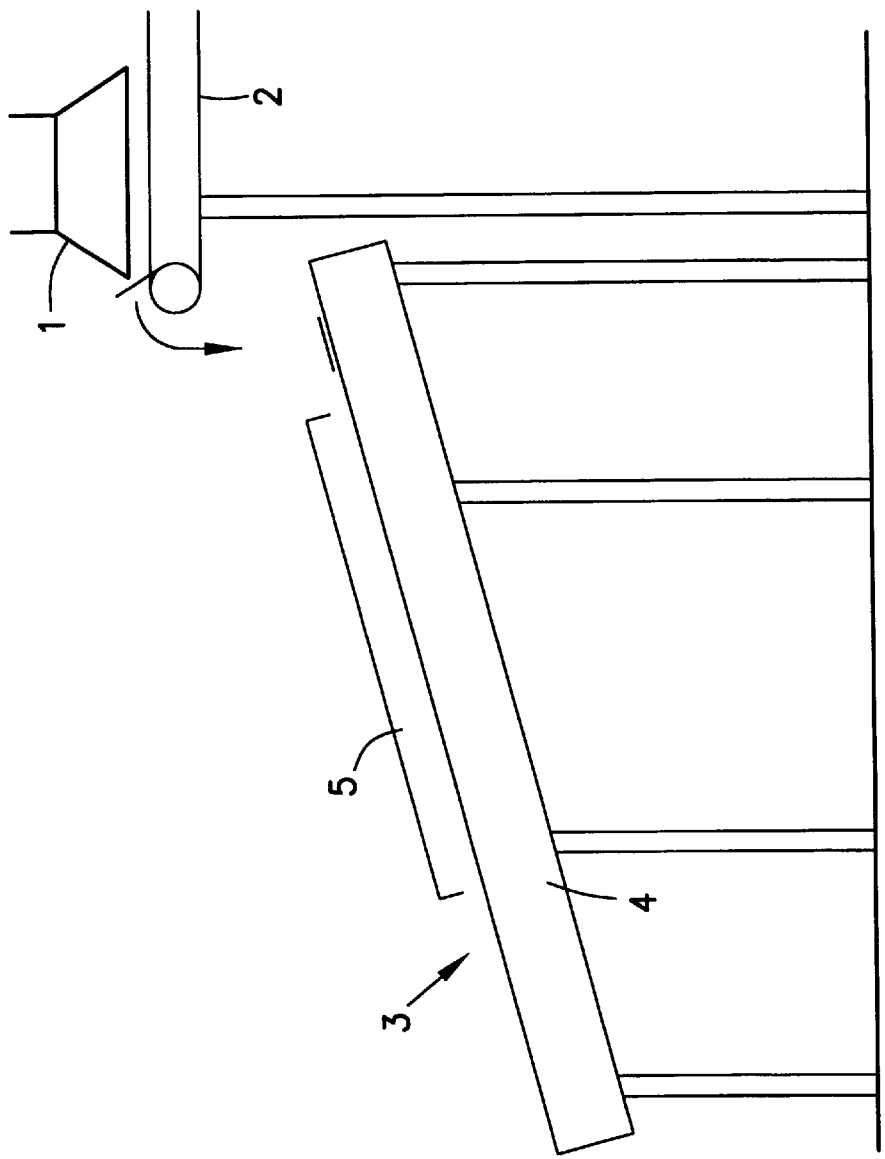
FIG. 1 shows a typical arrangement for processing cooked, peeled shrimp.

The present invention may be further understood with reference to the following description and the appended drawings, wherein like elements are provided with the same reference numerals.

Figure 2:
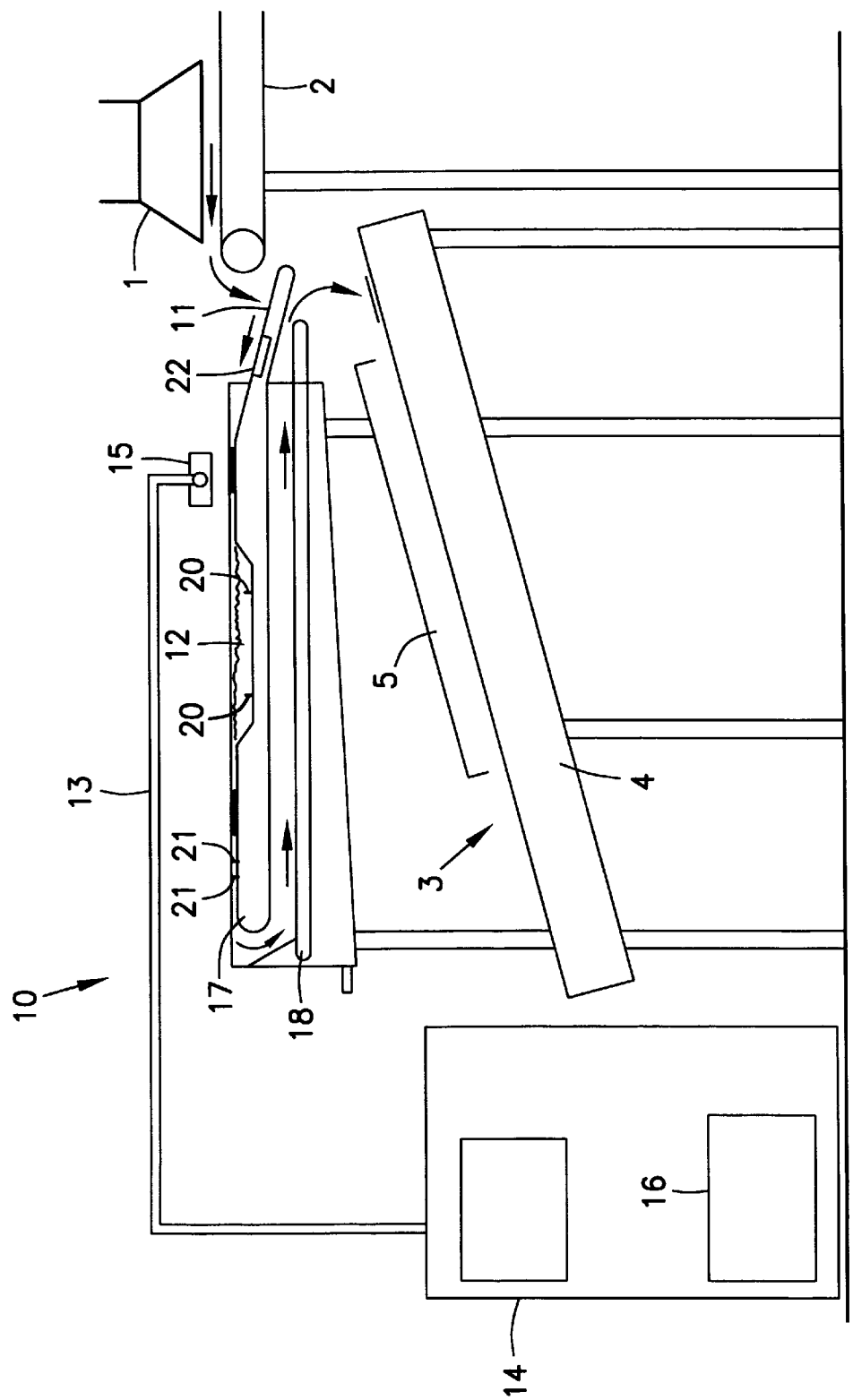
FIG. 2 shows an arrangement for processing shrimp according to the present invention.

FIG. 2 shows an apparatus for the preparation of shrimp according to the present invention. The apparatus of FIG. 2 includes all the elements of the arrangement described with respect to FIG. 1, including the cooking unit 1, conveyor 2, and peeling machine 3 consisting of the peeler 4 and shell breaker 5. Similarly to FIG. 1, the shrimp are cooked in boiler 1 and then fed onto conveyor 2. However, in contrast to FIG. 1, conveyor 2 feeds the cooked shrimp to an intermediate shrimp processing apparatus 10 rather than directly to the peeling machine 3. Conveyor 2 moves the cooked shrimp from the cooking unit 1 to conveyor 11 of shrimp cooling apparatus 10. Conveyor 11 moves the cooked shrimp towards a bath 12 where the cooked shrimp are immersed for cooling. As stated previously the cooked shrimp on conveyors 2 and 11 are exposed to the ambient temperature of the processing facility and will begin to cool. As described above the cooling effect will not be uniform, the shell will cool faster than the flesh, creating a temperature differential between the shell and the flesh. The cooked shrimp immersed in bath 12 of cooling liquid are cooled rapidly, however a temperature differential remains between the flesh and the shell because the shell is directly exposed to the cooling medium of bath 12, whereas the flesh is cooled by conduction through the shell. However, this temperature differential will be reduced by means described below, before the shrimp are fed to the peeling machine 3.

In a preferred embodiment, the cooling medium of bath 12 consists of an ice-brine slurry. Since the freezing temperature of brine is lower than 0° C., the bath 12 is able to be maintained at a predetermined temperature of approximately 0° C., while the ice-brine slurry remains pumpable through tubes 13 to the slurry spreading system 15. In the exemplary embodiment, the ice-brine slurry is created by slurry machine 14, which may be an ice-brine slurry machine as described in patent application Ser. No. 08/974, 833 filed Nov. 20, 1997, entitled "Method and Installation for Continuous Production of Whipped Ice", the subject matter of which is expressly incorporated herein by reference.

The temperature of the ice-brine slurry can be controlled to a desired temperature by modifying a ratio of ice to brine and by controlling the temperature of the brine entering the slurry machine 14. The ice-brine slurry is pumped from the slurry machine 14 through tubes 13 to a slurry spreading system 15 which distributes the slurry uniformly to the shrimp. Conveyors 11 and 17 may be arranged as a single conveyor or a combination of conveyors transporting the shrimp from cooking unit 1 through bath 12 to conveyor 18. The apparatus for conveying the shrimp from the boiler, through the cooling bath, whether a single conveyor or a combination of conveyors is referred to as the cooling conveyor system.

As the cooked shrimp are immersed in the bath 12, the ice-brine slurry cools the shrimp until a predetermined temperature distribution in the flesh and shell of the shrimp is obtained. For example, for 500 kg/hr of shrimp, 1,000 kg/hr of ice-brine slurry with a concentration of 25% ice will cause the shrimp to leave the cooling bath with a shell temperature of 0–5° C. and a flesh temperature of 20–40° C. As this cooling occurs the ice-brine slurry will melt into a liquid solution that is drained away from the bath 12. In order to keep the bath 12 at the desired predetermined temperature, additional ice-brine slurry will be pumped from slurry machine 14 to the shrimp at a rate selected to achieve the desired cooling. Several methods can be employed to control the flow of slurry from the slurry machine 14 to the shrimp. In a preferred embodiment, the slurry machine is provided with a microprocessor based control unit 16 that receives signals from one or more temperature sensors 20 in the bath 12. In a typical feedback control loop based on the temperature sensed in the bath 12, the control unit 16 of slurry machine 14 determines the amount of slurry to be pumped to the shrimp in order for the temperature of the bath 12 to be maintained at the desired predetermined temperature.

In addition, a temperature sensor, or sensors 21 can be employed on conveyor 17 after the bath 12. The temperature sensors 21 transmit a temperature of the cooled shrimp leaving the bath 12 to the control unit 16 and the control unit 16 controls an amount of slurry pumped to the slurry spreading system 15 sufficient to keep the shells of the shrimp at the desired predetermined temperature. In addition, the apparatus may include a mass/volume sensor 22 on conveyor 11 to transmit a signal corresponding to a mass or volume per unit time rate of shrimp traveling along the conveyor 11 to control unit 16. Based on the mass or volume per unit time rate of the shrimp, the control unit 16 may determine an amount of slurry to be pumped to the slurry spreading system 15 in order to cool the shrimp to the desired predetermined temperature. Of course one skilled in the art will understand that there are numerous methods and combinations of methods of feed back control schemes and manual control schemes to control the flow of slurry from the slurry machine 14 to the shrimp. In addition, those skilled in the art will understand that the control unit 16 may control a rate of slurry spreading, and/or a mass or volume per unit time rate of shrimp fed to the cooling apparatus 10 on the basis of the output of sensors 21 or 22.

It should also be understood that the cooling medium of the bath 12 can be any medium into which food items can be safely immersed that is capable of lowering the temperature of the cooked shrimp shell to a range of 0–5° C. and the flesh to a range of 20–40° C., e.g., ice, chilled brine and chilled water. The speed of the cooling conveyor system (conveyor 11 in FIG. 2) can be controlled in order to achieve the desired temperature distribution of the shrimp. The speed of the cooling conveyor system can be controlled by the control unit 16 in the same manner as the flow of ice-brine slurry from the slurry machine 14 to the shrimp—e.g., based on the mass or volume of shrimp output from cooking unit 1, on a temperature of the shrimp detected by, e.g., sensors 20 in the bath 12, or sensors 21 located along the conveyor 17.

The shells of the cooled shrimp emerging from bath 13 may preferably be in a temperature range of 0–5° C., while the flesh temperature remains between 20–30° C. However, the ideal temperature range for maximum efficient operation oi peeling machine 3 is preferably 15–25° C., or even more preferably 15–20° C. The cooled shrimp are carried away from the bath 12 by conveyor 17 which carries the shrimp to conveyor 18 which in turn carries the shrimp to the peeling machine 3. The shells of the shrimp moving along conveyors 17 and 18 begin to warm up due to exposure to the ambient temperature of the processing facility and absorption of heat from the flesh of the shrimp. Thus, as the shells warm and the flesh of the shrimp cool during travel on conveyors 17 and 18, the temperature differential between the shell and the flesh is reduced. Thus, the length of time the shrimp spend on conveyors 17 and 18 after leaving the bath 12 can be controlled to achieve a desired temperature differential. Of course, those skilled in the art will understand that, although conveyors 17 and 18 are shown in FIG. 2 as two separate conveyors, a single conveyor or three or more conveyors may also be used depending on the desired layout of the shrimp processing apparatus. Conveyor 18 or the combination of conveyors 17 and 18 are referred to as the warming conveyor system.

The conveyor 18 is coupled to the control unit 16 so that the speed of the warming conveyor system can be controlled by the control unit 16 so that when the shrimp arrive at peeling machine 3, the desired temperature distribution has been achieved. For example a temperature distribution throughout the shrimp of 15–25° C., or even more preferably 15–20° C., the ideal temperature range for the peeling machine 3 to operate most efficiently. Those skilled in the art will understand that the speed of the warming conveyor system may be controlled based on the output of temperature sensors 21 or other sensors (not shown) located along the conveyor 18 and/or based on the mass or volume rate output by the sensor 22, by calculating a temperature distribution between the shell and the flesh of the shrimp as they travel along the warming conveyor system. Based on this temperature distribution, a controller can control the speed of conveyor 18 so that the shrimp arrive at the peeling machine 3 at the desired temperature distribution. Again, one skilled in the art will understand that there are numerous methods and combinations of methods to control the delivery time of the shrimp from bath 12 to peeling machine 3 so long as the shrimp arrive at the peeling machine 3 at the desired temperature and temperature distribution.

Figure 3:
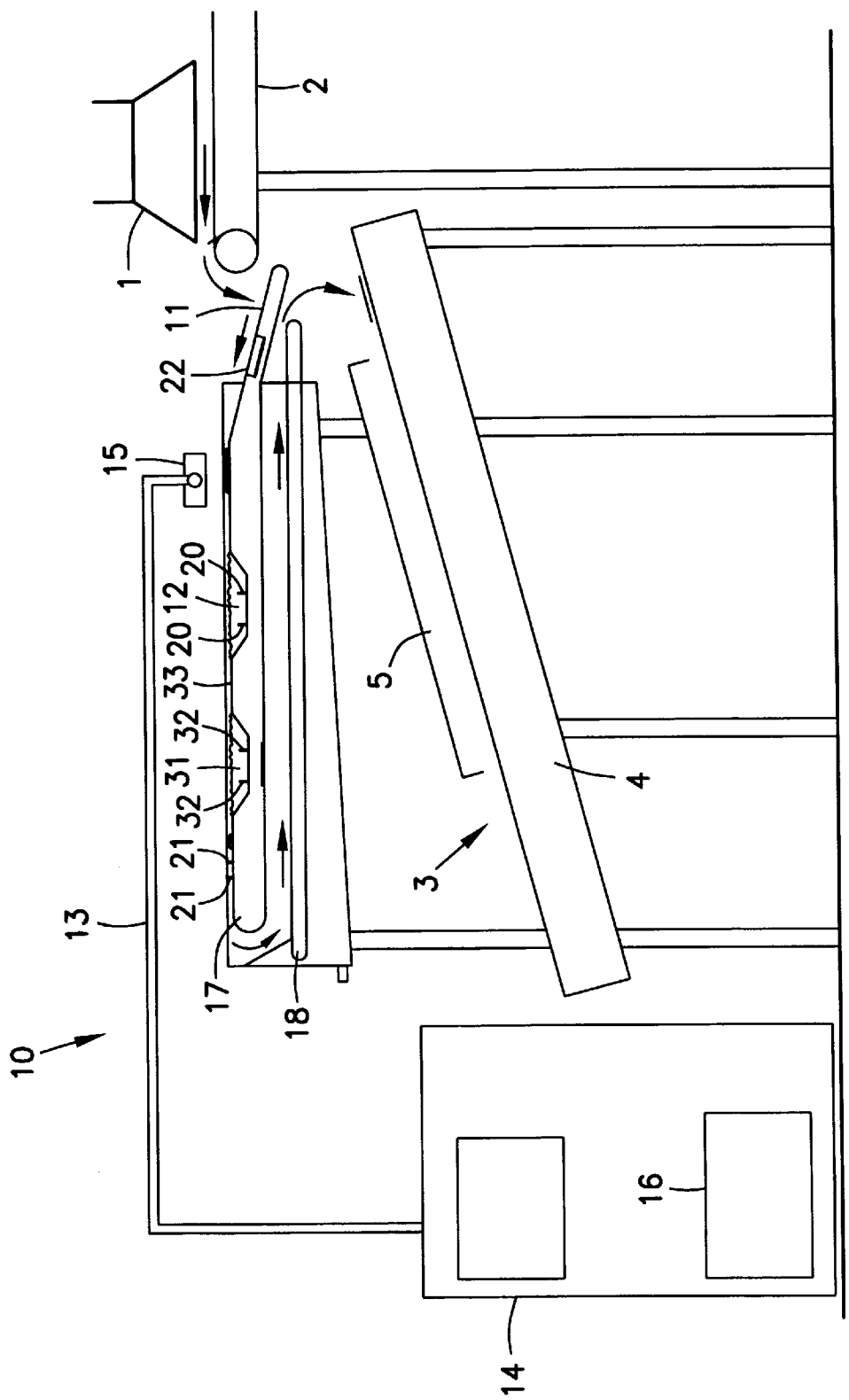
FIG. 3 shows an alternative arrangement for processing shrimp according to the present invention

FIG. 3 shows an alternative embodiment of an apparatus for processing shrimp according to the present invention. The apparatus of FIG. 3 includes all the elements of the apparatus of FIG. 2 with the addition of a second bath 31, and additional temperature sensors 32 and conveyor 33. The operation of the apparatus in FIG. 3 is substantially similar to the operation described above for the apparatus shown in FIG. 2. Conveyor 11 transports the cooked shrimp from cooking unit 1 to bath 12, where the shrimp are immersed in, e.g., ice-brine slurry delivered from slurry machine 14 through tubes 13 and slurry spreading system 15 to the shrimp. In this embodiment, conveyor 33 transports the shrimp and the ice-brine slurry from bath 12 to bath 31 where the shrimp are immersed in cooling medium a second time so that the shrimp leave bath 31 at a predetermined temperature distribution. Conveyor 17 then transports the shrimp to conveyor 18, which in turn transports the shrimp to the peeling machine 3 so that they arrive at the peeling machine 3 at the desired predetermined temperature distribution.

Temperature sensors 32 in the bath 31 are coupled to the control unit 16 so that the control unit 16 can control delivery of shrimp to the peeling machine 3 and/or the delivery of cooling medium via the slurry spreading system 15 in the same manner described in regard to the apparatus of FIG. 2.

It will be appreciated by those skilled in the art that the present invention can be embodied in other specific forms without departing from the spirit or essential characteristics thereof. The presently disclosed embodiments are therefore considered in all respects to be illustrative only and the invention is to be limited only by the scope of the claims appended hereto.

What is claimed is:

1. An apparatus for processing shrimp, comprising:
    a cooking unit;
    a first conveyor for transporting cooked shrimp away from the cooking unit;
    a cooling device for cooling the cooked shrimp received from the first conveyor;
    a peeling device;
    a second conveyor for transporting the cooled shrimp from the cooling device to the peeling device; and
    a control device for controlling at least one of the cooling device and the second conveyor so that shrimp are delivered to the peeling device at a predetermined temperature distribution.

2. The apparatus according to claim 1, wherein a shrimp feeding rate corresponding to a quantity of shrimp per unit time is supplied to the control device, and wherein the control device controls at least one of a supply of a cooling medium to the cooling device and a time required by the second conveyor to deliver the shrimp to the peeling device based on the shrimp feeding rate.

3. The apparatus according to claim 1, further comprising a temperature measuring device for providing to the control unit a signal corresponding to a temperature of the shrimp leaving the cooling device, wherein the control device controls at least one of a supply of a cooling medium to the cooling device and a time required for the second conveyor to deliver the shrimp to the peeling device based on the temperature of the shrimp.

4. The apparatus according to claim 1, wherein a shrimp feeding rate corresponding to a quantity of shrimp per unit time is supplied to the control device, and wherein the control device controls at least one of a supply of a cooling medium to the cooling device and a time required by the first conveyor to transport the shrimp through the cooling device.

5. The apparatus according to claim 1, further comprising a temperature measuring device to measure a temperature of a cooling medium supplied to the cooling device, wherein the control device controls at least one of a supply of a cooling medium to the cooling device and a time required by the first conveyor to transport the shrimp through the cooling device.

6. The apparatus according to claim 1, wherein the cooling device includes a bath containing a cooling medium in which the shrimp are immersed.

7. The apparatus according to claim 1, further comprising a delivery system for delivering a cooling medium to the shrimp, wherein the control device controls a rate at which the delivery system delivers the cooling medium to the shrimp based on at least one of a shrimp feeding rate corresponding to a quantity of shrimp per unit time and a temperature of the shrimp entering the cooling device.

8. The apparatus according to claim 7, wherein the cooling medium is an ice-brine slurry.

9. The apparatus according to claim 8, wherein the rate at which the ice-brine slurry is delivered to the shrimp is twice the shrimp feeding rate.

10. The apparatus according to claim 8, wherein the ice-brine slurry has a concentration of approximately 25%.

11. The apparatus according to claim 1, wherein both a shell temperature and a flesh temperature of shrimp in the predetermined temperature distribution are in a range of 15 to 25° C.

12. The apparatus according to claim 1, wherein the shell temperature and the flesh temperature of shrimp in the predetermined temperature distribution are in a range of 15 to 20° C.

13. A method for processing shrimp, comprising the steps of:
    transporting cooked shrimp from a cooking unit to a cooling device;
    cooling the shrimp to achieve a first predetermined temperature distribution between flesh and shell portions of the shrimp;
    controlling the temperature distribution in the flesh and shell portions of the shrimp to achieve a second predetermined temperature distribution; and
    delivering the shrimp to the peeling device at the second predetermined temperature distribution.

14. The method according to claim 13, wherein the temperature distribution is adjusted from the first predetermined temperature distribution to the second distribution while the shrimp are being conveyed from a cooling device to the peeling device.

15. The method according to claim 14, wherein the controlling of the temperature distribution from the first predetermined temperature distribution to the second distribution is accomplished by controlling a conveying time of the shrimp from the cooling device to the peeling device.

16. The method according to claim 15, wherein the conveying time is based on a shrimp feeding rate corresponding to a quantity of shrimp per unit time transported from the cooking unit.

17. The method according to claim 15, wherein the conveying time is based on a temperature of the shrimp leaving the cooling device.

18. The method according to claim 13, wherein the shrimp are cooled lo the first predetermined temperature distribution by controlling a length of time during which the shrimp are cooled.

19. The method according to claim 18, wherein the cooling time is based on a shrimp feeding rate corresponding to a quantity of shrimp per unit time transported from the cooking unit.

20. The method according to claim 18, wherein the cooling time is based on a temperature of a cooling medium supplied to the shrimp.

21. The method according to claim 18, wherein, when the shrimp are in the first predetermined temperature distribution, the shell portions of the shrimp are in a range 0–5° C. and the flesh portions of the shrimp are in a range of 20 to 40° C.

22. The method according to claim 13, wherein, when the shrimp are in the first predetermined temperature distribution, a temperature differential between the shell portions of the shrimp and the flesh portions of the shrimp is in a range of 15 to 20° C.

23. The method according to claim 13, wherein, when the shrimp arc in the second predetermined temperature distribution, the shell temperature of the shrimp and the flesh temperature of the shrimp are in a range of 15 to 25° C.

* * * * *